(12) United States Patent
Yadav et al.

(10) Patent No.: US 7,750,923 B2
(45) Date of Patent: Jul. 6, 2010

(54) IMPLEMENTING LIMITED FUNCTION MODE IN A DISPLAY DEVICE

(75) Inventors: Hanumant Kumar Yadav, Issaquah, WA (US); William J. Westerinen, Issaquah, WA (US); Todd L. Carpenter, Monroe, WA (US); Stephen Richard Drake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 11/696,848

(22) Filed: Apr. 5, 2007

(65) Prior Publication Data

US 2008/0246774 A1 Oct. 9, 2008

(51) Int. Cl.
G09G 5/00 (2006.01)
(52) U.S. Cl. .......... 345/618; 455/409; 455/411; 463/29; 463/30; 705/52; 705/80; 340/5.32; 340/5.4; 340/5.42
(58) Field of Classification Search ............. 463/29, 463/30; 345/698, 618; 705/52, 80; 455/409, 455/411; 340/5.32, 5.4–5.42
See application file for complete search history.

(56) References Cited

U.S. PATENT DOCUMENTS 4,361,754 A * 11/1982 Hoskinson et al. .......... 235/381
4,790,010 A * 12/1988 Sgrignoli .................... 380/210
5,613,139 A 3/1997 Brady
6,041,385 A 3/2000 Shipman et al.
6,088,757 A 7/2000 Boonie et al.
6,112,222 A 8/2000 Govindaraju et al.
6,247,025 B1 6/2001 Bacon (Continued)

FOREIGN PATENT DOCUMENTS

WO    WO 9956254 A1 * 11/1999

OTHER PUBLICATIONS

Microsoft Computer Dictionary, 2002, p. 155, 177.*
Weiss, A., "Will the open, unrestricted PC soon become a thing of the past?," http://delivery.acm.org/10.1145/1160000/1152302/p18-weiss.html?key1=1152302&key2=3312061711&coll=ACM&dl=ACM&CFID=15151515&CFTOKEN=6184618, vol. 10 No. 3 p. 18-25. 2006.

*Primary Examiner*—Michelle K Lay
(74) *Attorney, Agent, or Firm*—Marshall, Gerstein & Borun LLP

(57) ABSTRACT

A display device for use with a computer adapted for operation in an unrestricted use mode and a limited function mode and a method for enforcing a limited function mode display is disclosed. The display device enters a limited function mode when a condition of non-compliance with an operating policy is discovered by the computer. Additionally, the display device may also enter a limited function mode upon powering up or when connections to the computer and/or selected components of the display are disabled or disconnected. When in the limited function mode, the display may support a limited function interface for use in correcting the condition of non-compliance.

20 Claims, 9 Drawing Sheets

U.S. PATENT DOCUMENTS

| | | |
|---|---|---|
| 6,421,721 B1 | 7/2002 | Dadsetan et al. |
| 6,470,027 B1 * | 10/2002 | Birrell, Jr. .................... 370/465 |
| 6,570,708 B1 | 5/2003 | Bergeron et al. |
| 6,678,824 B1 * | 1/2004 | Cannon et al. ................. 726/22 |
| 6,684,262 B1 | 1/2004 | Miller et al. |
| 6,782,440 B2 | 8/2004 | Miller |
| 6,944,296 B1 * | 9/2005 | Liu et al. .................... 380/201 |
| 7,174,434 B2 | 2/2007 | Blumrich et al. |
| 7,319,469 B2 * | 1/2008 | Dawson ...................... 345/629 |
| 2001/0026248 A1 * | 10/2001 | Goren et al. .................... 345/7 |
| 2003/0107584 A1 * | 6/2003 | Clapper ...................... 345/619 |
| 2003/0145102 A1 * | 7/2003 | Keller-Tuberg ............. 709/237 |
| 2003/0216824 A1 * | 11/2003 | Chu et al. ..................... 700/94 |
| 2004/0085351 A1 | 5/2004 | Tokkonen |
| 2006/0227364 A1 * | 10/2006 | Frank et al. ................ 358/1.15 |

* cited by examiner

US 7,750,923 B2

IMPLEMENTING LIMITED FUNCTION MODE IN A DISPLAY DEVICE

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates their account, and while the cellular telephone may power up, calls cannot be made because the service provider will not allow them. The deactivated phone has no "salvage" value, because the phone will not work elsewhere and the component parts are not easily salvaged nor do they have a significant street value. When the account is brought current, the service provider will reconnect the device to network and allow making calls.

This model works well when the service provider, or other entity taking the financial risk of providing subsidized hardware, has a tight control on the use of the hardware and when the device has little salvage value. This business model does not work well when the hardware has substantial uses outside the service provider's span of control. For example, a personal computer may be disassembled and sold as components, creating a potentially significant loss to the underwriter of subsidized equipment. In the case where an Internet service provider underwrites the cost of the personal computer with the expectation of future fees, this "untethered value" creates an opportunity for fraudulent subscriptions and theft. Pre-pay business models, where a user pays in advance for use of a subsidized, high value computing system environment have similar risks of fraud and theft.

Enforcing an operating policy that requires payment of subscription fees or pay-per-use fees will encourage users to meet their financial commitments to an underwriter that subsidizes the purchase price of the computer. However, enforcement circuits will draw the attention of hackers or thieves who wish to benefit themselves by stealing computer services or by stealing the computer itself and/or its components and peripherals.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computer configured to self-monitor and enforce compliance to an operating policy, such as a pay-per-use operating policy or a subscription operating policy, may use a secure execution environment component configured to impede access to peripheral and support circuits when non-compliance to the operating policy is determined. By having the peripheral itself also respond to conditions of noncompliance to an operating policy, an additional level of enforcement may be provided and may make the peripheral less attractive as a target of theft.

When the peripheral is a display device, the response to a condition of noncompliance to an operating policy may be implemented by limiting or disabling a portion of the display such that the screen output is not suitable for normal use. A different portion of the display, however, may remain decipherable in order to support enough of a user interface to enable a return to a full unrestricted use mode. The limited function mode of the display device may also be entered if thieves try to steal the display device itself or a component of the display, thus rendering the display device unusable. In another scenario, the display device may power up in a limited function mode to ensure that the display device does not operate with a non-pay-per-use system. Upon connection with a pay-per-use system and compliance to an operating policy, the display device may re-establish an unrestricted use mode and return to producing full quality output.

DRAWINGS

Figure 7:
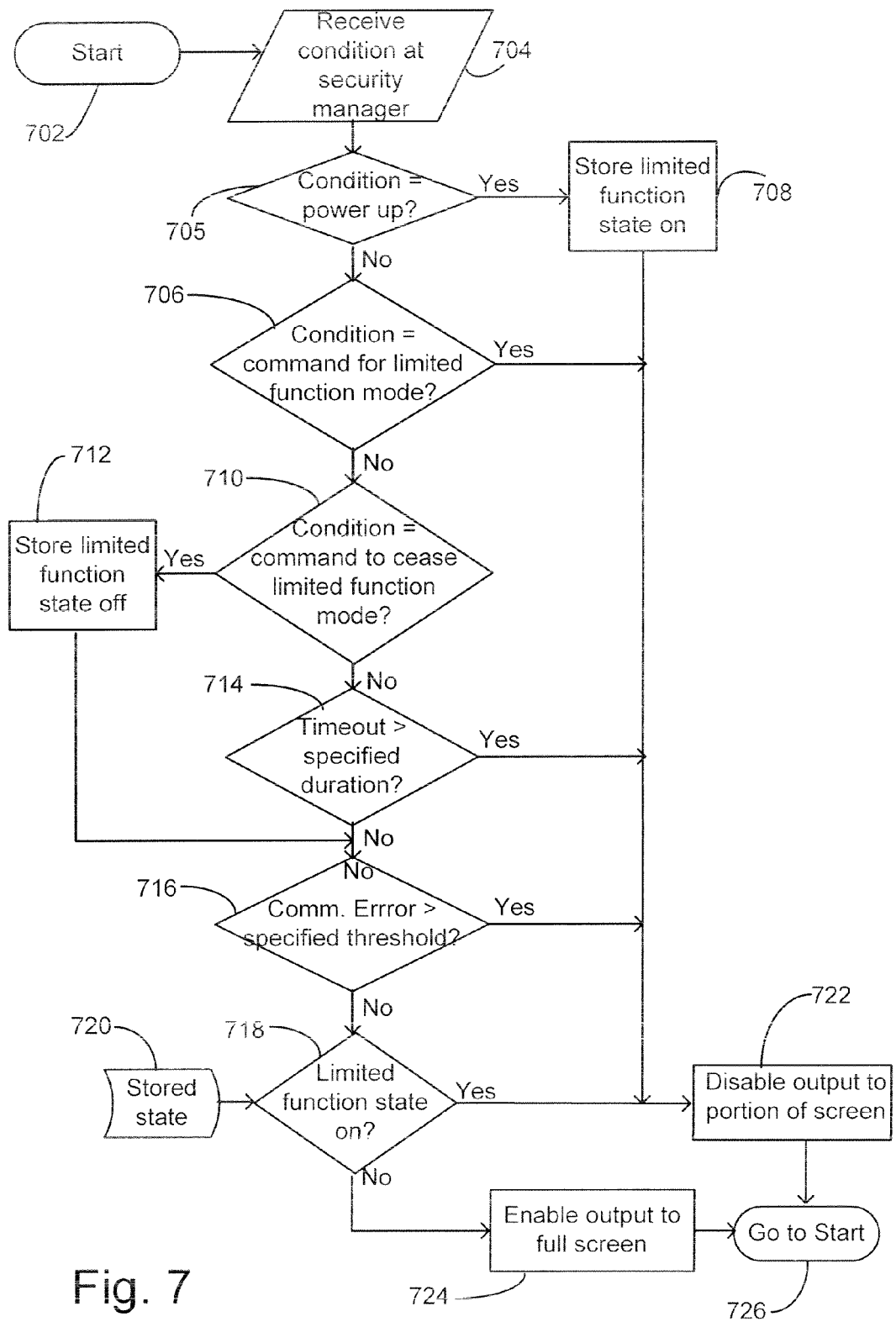
Figure 8:
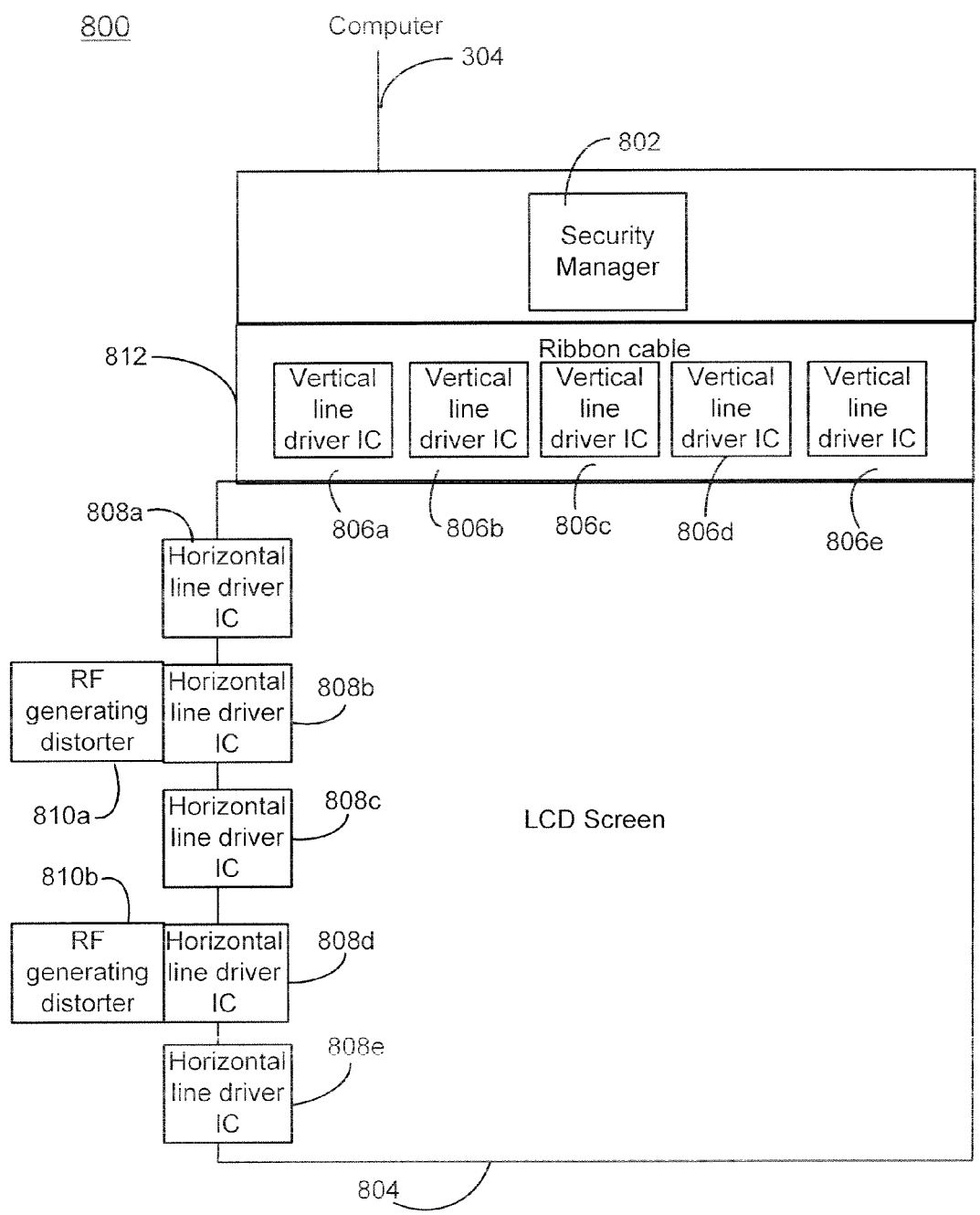

FIG. 7 illustrates a flowchart of steps to enforce a limited function mode in a computer display for use with a computer adapted for operation in an unrestricted use mode and a limited function mode; and FIG. 8 illustrates an embodiment, wherein the screen uses LED technology, the drivers use a set of vertical line driver integrated circuits and a set of horizontal line driver integrated circuits, the distorter is operable to generate an RF signal which interferes with the operation of a horizontal line driver, and multiple distorters are individually in communication with select horizontal line drivers.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
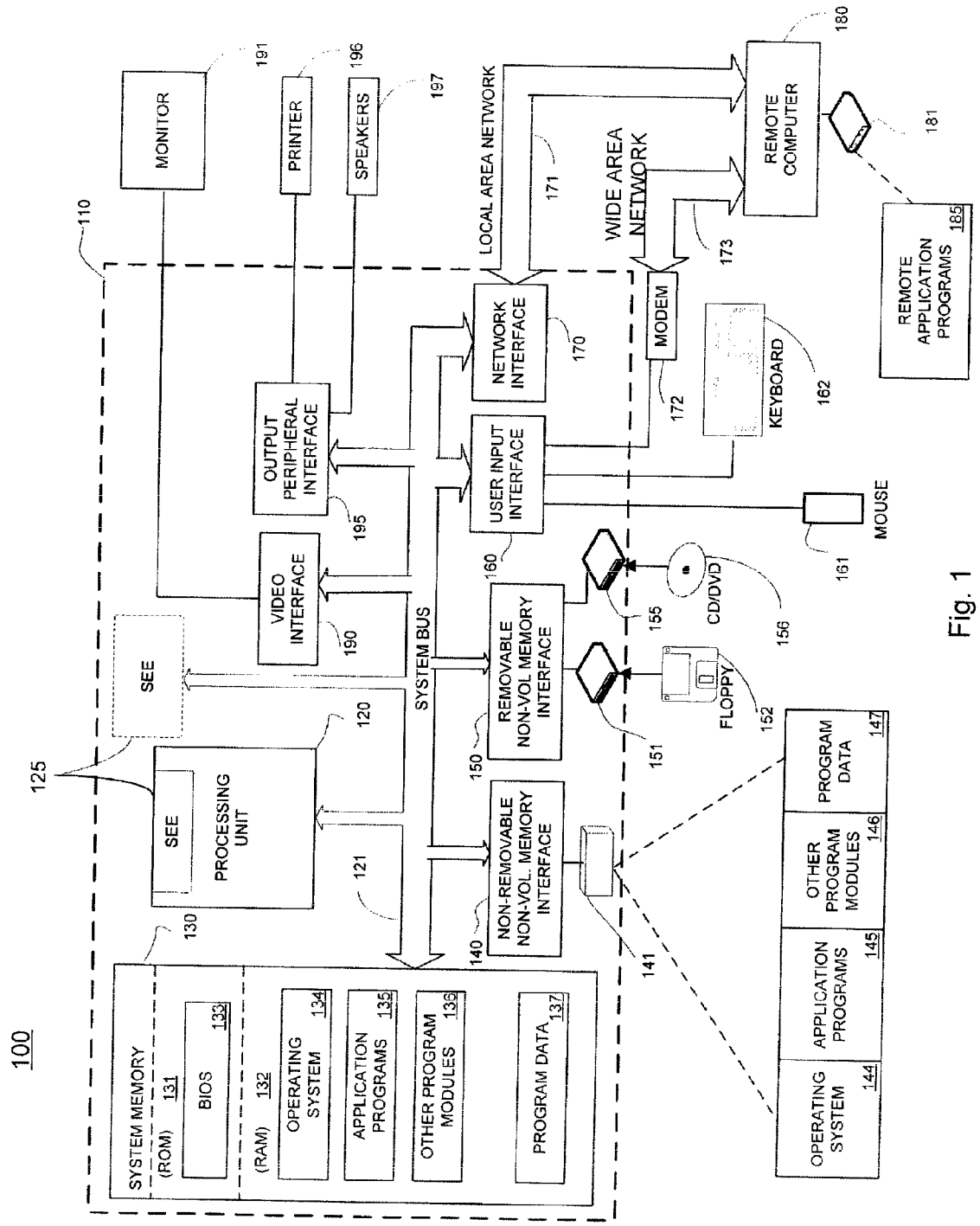
FIG. 1 illustrates a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus. Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may be computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The computer 110 may include a secure execution environment 125 (SEE). The SEE 125 may be enabled to perform monitoring and enforcement related to terms and conditions associated with pay-per use and/or subscription operating policy use. The secure execution environment 125 may be embodied in the processing unit 120, as a standalone component, or as part of another circuit, as depicted in later figures.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
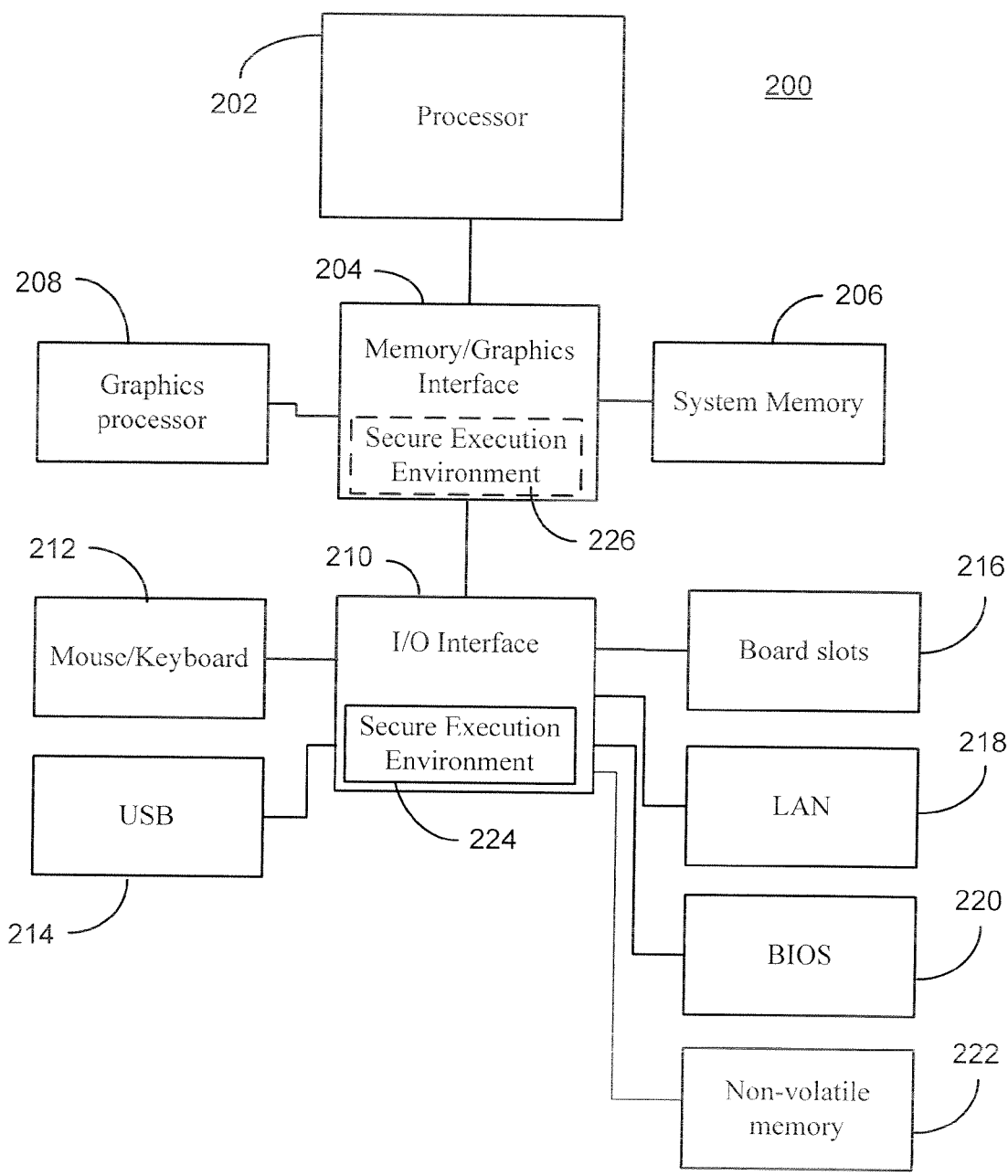
FIG. 2 is a block diagram of an architecture of a computer adapted for operation in an unrestricted use mode and a limited function mode.

FIG. 2 is an architectural block diagram of a computer 200 the same as or similar to the computer of FIG. 1. The architecture of the computer 200 of FIG. 2 may be typical of general-purpose computers widely sold and in current use. A processor 202 may be coupled to a graphics and memory interface 204. The graphics and memory interface 204 may be a "Northbridge" controller or its functional replacement in newer architectures, such as a "Graphics and AGP Memory Controller Hub" (GMCH). The graphics and memory interface 204 may be coupled to the processor 202 via a high speed data bus, such as the "Front Side Bus" (FSB), known in computer architectures. The processor 202 may also be connected, either directly or through the graphics and memory interface 204, to an input/output interface 210 (I/O interlace). The I/O interface 210 may be coupled to a variety of devices represented by, but not limited to, the components discussed below. The I/O interface 210 may be a "Southbridge" chip or a functionally similar circuit, such as an "I/O Controller Hub" (ICH). Several vendors produce current-art Northbridge and Southbridge circuits and their functional equivalents, including Intel Corporation.

A variety of functional circuits may be coupled to either the graphics and memory interface 204 or the I/O Interface 210. The graphics and memory interface 204 may be coupled to system memory 206 and a graphics processor 208, which may itself be connected to a display (not depicted). A mouse/keyboard 212 may be coupled to the I/O interface 210. A universal serial bus (USB) 214 may be used to interface external peripherals including flash memory, cameras, network adapters, etc. (not depicted). Board slots 216 may accommodate any number of plug-in devices, known and common in the industry. A local area network interface (LAN) 218, such as an Ethernet board may be connected to the I/O interface 210. Firmware, such as a basic input output system (BIOS) 220 may be accessed via the I/O interface 210. Nonvolatile memory 222, such as a hard disk drive, may also be coupled to the I/O interface 210.

A secure execution environment 224 is shown disposed in the I/O interface 210. An alternate embodiment, showing another secure execution environment 226 disposed in the graphics and memory interface 204 is also shown. While system configurations with more than one secure execution environment are supported, one embodiment is directed to a single instance of the secure execution environment. The secure execution environment 224 or secure execution environment 226 may be the interface to peripherals and support circuits to impede access in response to noncompliance to an operating policy.

Figure 3:
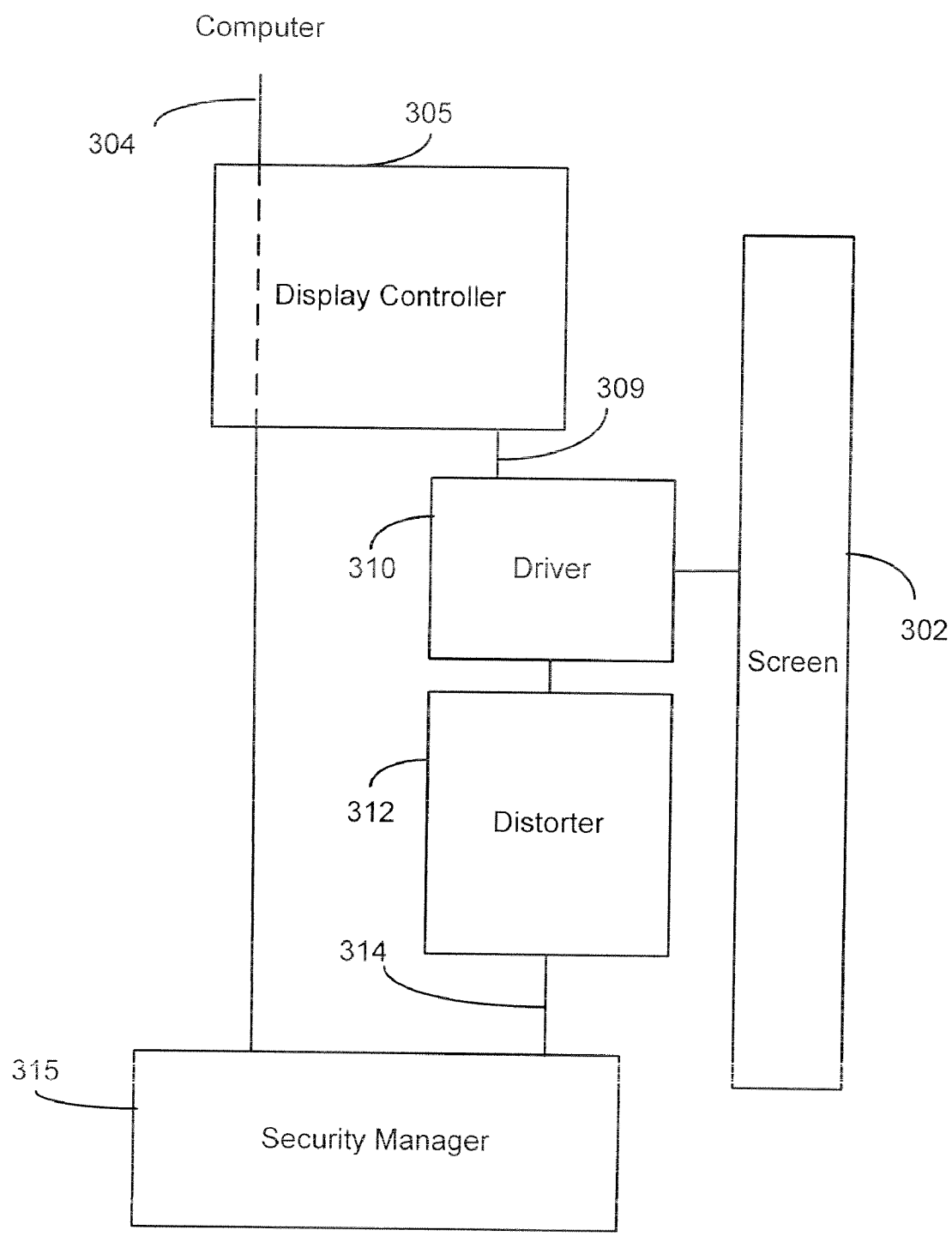
FIG. 3 illustrates an embodiment of a display device for use with a computer adapted (or operation in an unrestricted use mode and a limited function mode.

FIG. 3 is an illustration of a display device 300 for use with a computer, such as computer 200 of FIG. 2, over communication link 304, where communication link 304 may be a physical connection to the computer, e.g., a wired or optical connection. In another embodiment, the communication link 304 may be wireless. The computer may be adapted for operation in an unrestricted use mode and a limited function mode. A seller may sell a display device 300 at a reduced price in exchange for a user agreeing to certain conditions. If the conditions are not met, the seller may desire to restrict or limit the functionality of the display device 300.

The display device 300 may consist of a display controller 305 in communication with the computer. The display controller 305 may be in communication with a driver 310 which supports output to a portion of a screen 302. The communication channel 309 between the display controller 305 and the driver 310 may or may not be wireless. A security manager 315 may be in communication with a distorter 312 such that the security manager 315 directs the distorter 312 to activate when a condition corresponding to operation in the limited function mode occurs, thus distorting output to a portion of the screen. The communication channel 314 between the security manager 315 and the distorter 312 may or may not be wireless.

A condition corresponding to operation in the limited function mode may include receiving a command over the communication link 304 when the computer detects noncompliance with an operating policy and signals the display device 300 to enter a limited function mode. The command may be routed by the display controller 305 to the security manager 315. Alternatively, the command may be intercepted by the display controller 305 and forwarded to the security manager 315. In another embodiment, the command bypasses the display controller 305 and arrives directly at the security manager 315. The security manager 315 may also include a cryptographic function for verifying commands from the computer. Of course, other embodiments are possible.

Other conditions corresponding to operation in the limited function mode may include the initial operation of the display device 300 after application of power or after a warm restart, the display device 300 detecting degraded or lost communication with the computer, and the display device 300 detecting a loss of communication with a component of the display device 300. Any of these conditions occurring independently may be sufficient for the display device 300 to activate distortion to a portion of the screen 302.

Enabling output to the full screen 302 may occur when the computer detects compliance with the operating policy and sends a command over the communication link 304 instructing the display device 300 to cease activity in the limited function mode. This command may be received after the display device 300 is integrated into a pay-per-use environment and the communication link 304 is of sufficient quality. The command to cease operation in the limited function mode may be routed from the communication link 304 to the security manager 315 such as in the embodiments described above. When the command is received by the security manager 315, the security manager 315 may direct the distorter 312 to cease distortion, provided that all communication with the computer and display device components are operating at a specified level of quality.

The display device 300 may use different technologies. In one embodiment, the screen 302 is a LCD (liquid crystal display), the driver 310 is a line driver integrated circuit, and the distorter 312 generates RF (radio frequency) interference to distort the output of the line driver. In another embodiment, the screen 302 is a CRT (cathode ray tube), the driver 310 is an electron beam generator, and the distorter 312 is an electromagnetic field generator to distort the electron beam. In a third embodiment, the display uses plasma display technology, the driver 310 uses electrodes to charge gas ions in the cells of the screen 302, and the distorter 312 uses control circuitry to selectively charge the electrodes in a manner such that the output to the screen 302 is distorted. Other embodiments using organic light emitting diode (OLED), surface-conduction electron-emitter display (SED), video projection, and electrophoretic display and proper drivers are possible and are contemplated.

Different architectures may be used that support different embodiments, by varying combinations of multiple or single security managers 315, distorters 312, and/or drivers 310. As an example and not a limitation, in one embodiment, the display controller 305 and the security manager 315 are the same entity in the display device 300 while in another embodiment, they are separate entities. In a different embodiment, there is one distorter 312 in communication with multiple drivers 310. In yet another embodiment, there are multiple distorters 312 in communication with one-on-one with multiple drivers 310. In yet another embodiment, a single security manager 315 is in communication to a plurality of distorters 312.

In another embodiment, communication link 304 to the display device 300 may be wireless. In one scenario, the wireless communication to the display device 300 over communication link 304 is degraded and may cause the limited function mode condition. In another scenario, a wireless signal is communicated over communication link 304 to the display device 300 to degrade the display. In yet other embodiments, communication channel 309 may be wireless and communication channel 314 may be wireless; if either communication channel 309 or 314 is degraded, the limited function mode condition may occur. Of course, other embodiments are possible.

Figure 4A:
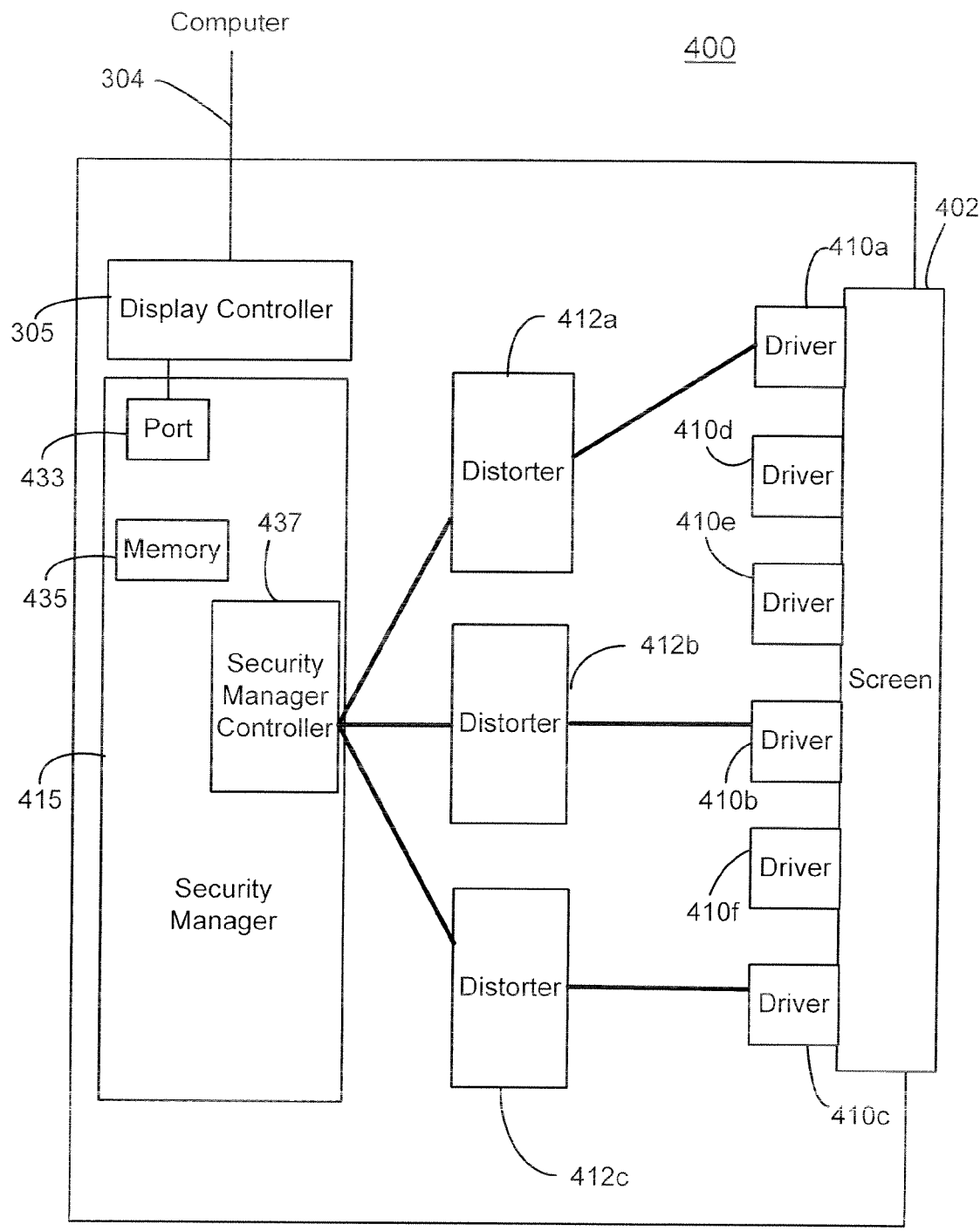
FIG. 4a illustrates an embodiment of a display distorter from FIG. 4, wherein the elements of the display distorter are shown in more detail.

FIG. 4a is illustrates one architectural embodiment of a display device 400. In this embodiment, the display controller 305 and security manager 415 are separate single entities, the security manager 415 is in communication to multiple distorters 412a-412c, there is a plurality of drivers 410a-f, and each distorter 412a-c is in communication with a selected driver 410a-c. When the computer directs the display device 400 to enter a limited function mode, this information may be communicated via the display controller 305 to the security manager port 433. The security manager controller 437 interprets the command and may store the limited function mode state in the security manager memory 435, and then may direct the distorters 412a-c to activate distortion. The security manager 437 may also direct the distorters 412a-c to activate when a loss or degradation of communication with the computer is detected. Note that this architecture may distort a portion of the screen 402's output corresponding to drivers 410a-c. The output corresponding to drivers 410d-f may not be affected.

Figure 4B:
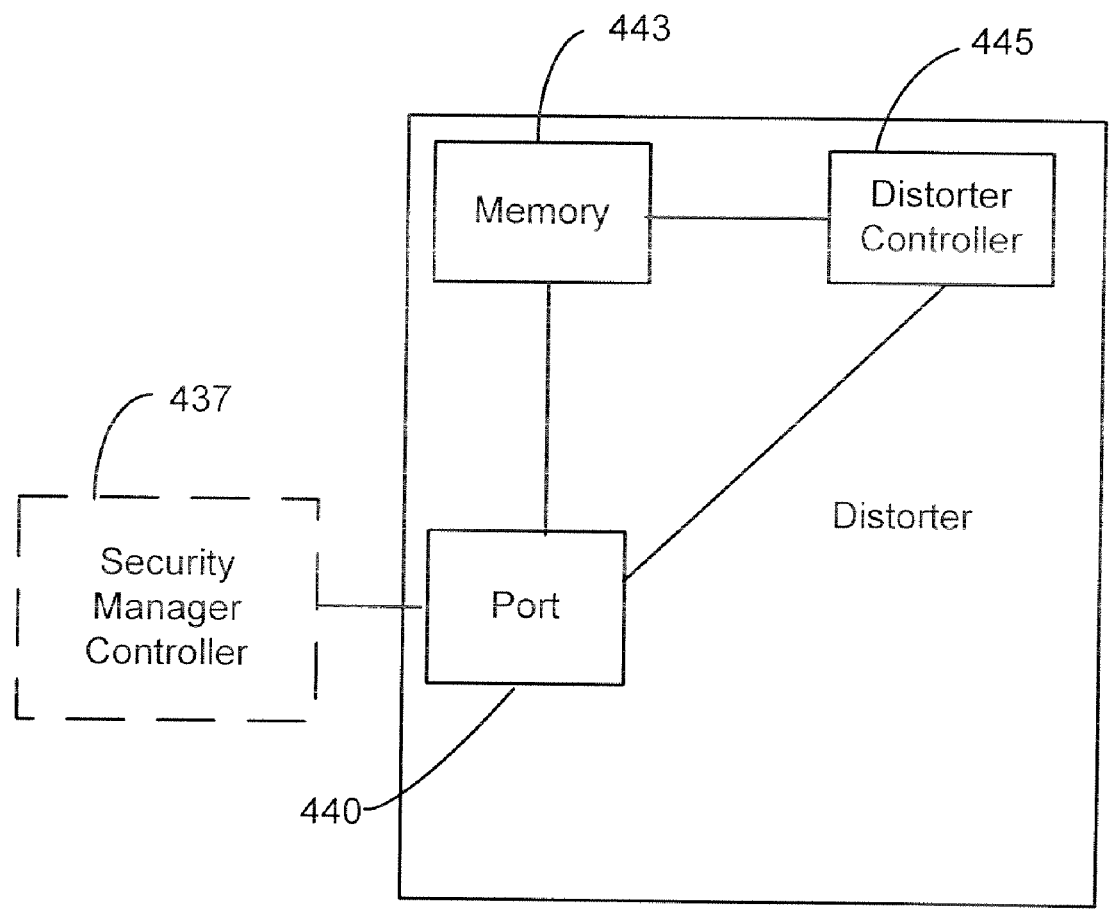
FIG. 4 illustrates an alternate embodiment, wherein a display device has a plurality of distorters and a plurality of drivers with a one-to-one correspondence.

A detailed view of the distorter 412 is illustrated by FIG. 4b. When the security manager controller 437 directs the distorters 412a-c to activate, this information may be signaled to the distorter 412 via the distorter's port 440. The distorter controller 445 may store the signal state in the distorter memory 443, and may activate the distortion function. The distorter controller 445 may also activate distortion when a loss or degradation of communication with the security manager controller 437 is detected, or upon powering up of the display device 400. An example of an implementation using this architectural embodiment may be the LCD technology discussed above.

Figure 5:
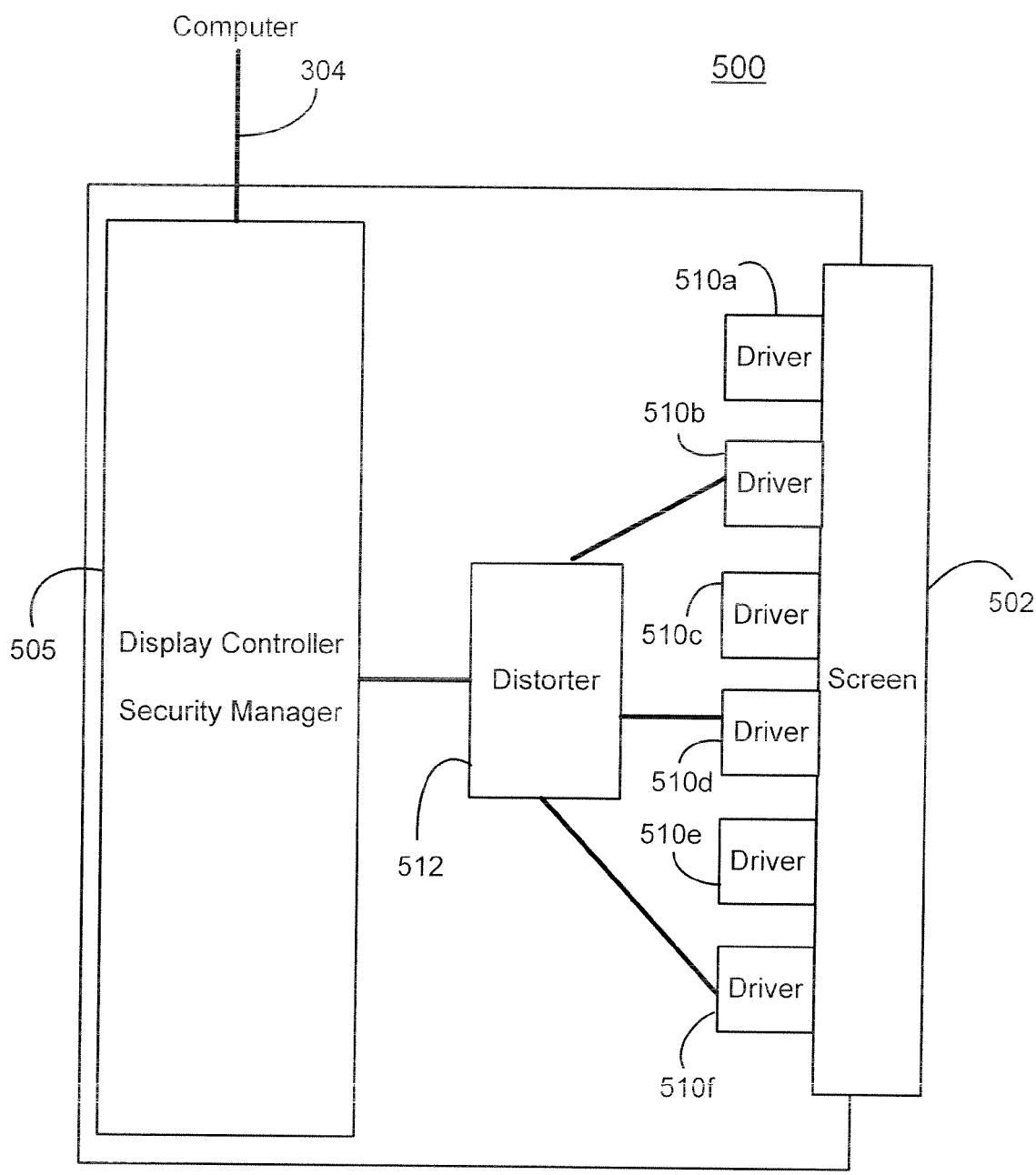
FIG. 5 illustrates an alternate embodiment, wherein a display controller and a security manager are the same entity and a single distorter is in communication with multiple drivers.

FIG. 5 illustrates another architectural embodiment of a display device 500. In this embodiment, and the display controller and security manager are the same entity 505. A plurality of drivers 510a-f are present, and select drivers are in communication to a single distorter 512. An example of an implementation using this architectural embodiment may be the plasma display technology as discussed above.

Figure 6:
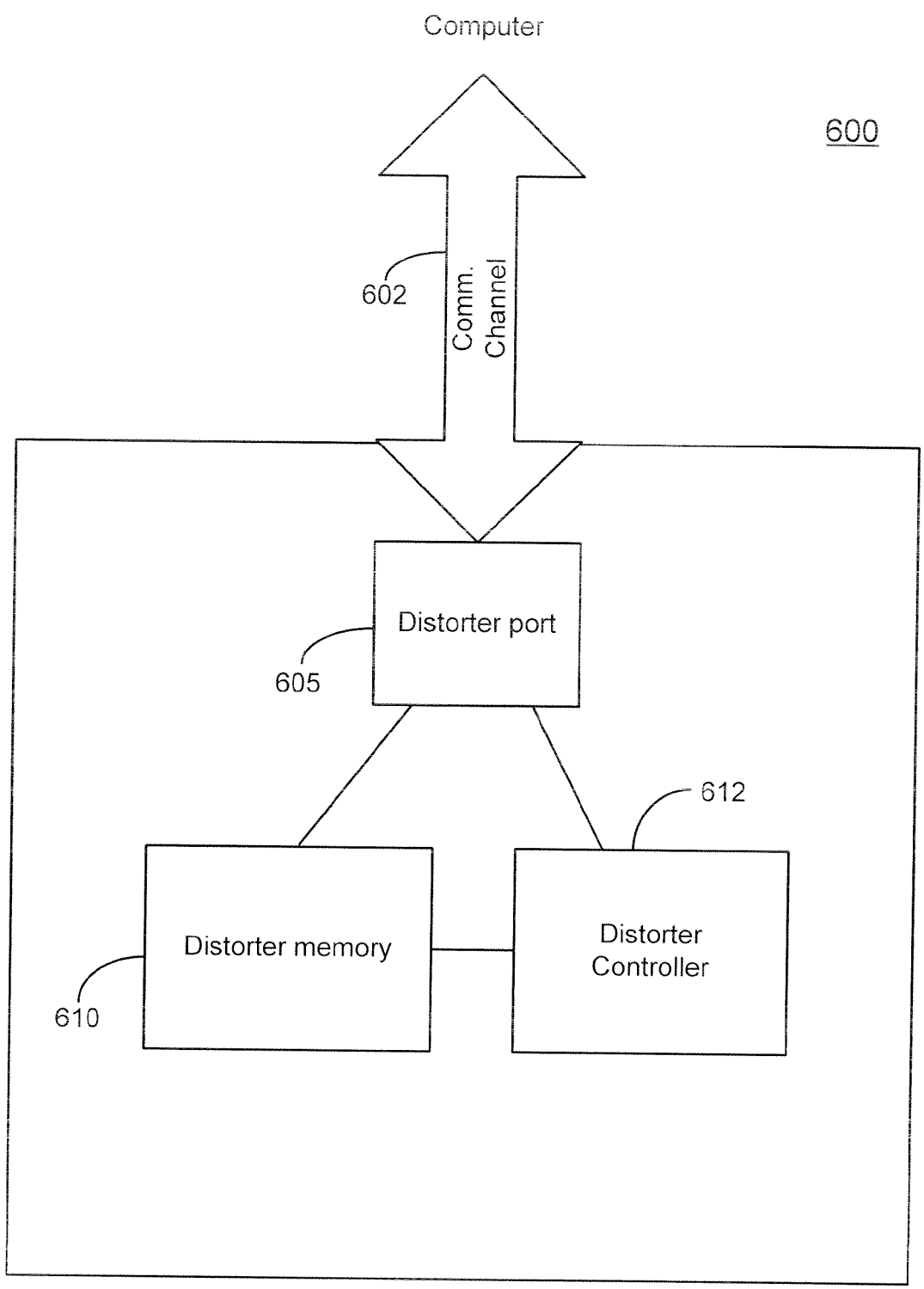
FIG. 6 illustrates an embodiment of a display distorter for use with a computer adapted for operation in an unrestricted use mode and a limited function mode.

FIG. 6 illustrates yet another embodiment of using a display distorter 600. In this embodiment, the display distorter 600 may be in communication directly to a computer adapted for use in an unrestricted use mode and a limited function mode via a communication channel 602. The communication channel 602 may or may not be wireless. Commands for operation in the limited function mode and ceasing operation in the limited function mode may be received via the communication channel 602 at the distorter's port 605. The display distorter 600 may power up in a limited function mode, or it may enter the limited function mode upon the reception of a command. The distorter controller 612 may store the state information corresponding to the condition in the distorter memory 610, and activate or deactivate distortion corresponding to the state. The distorter controller 612 may also detect communication loss or degradation, which may result in activating distortion.

FIG. 7 illustrates a flowchart for enforcing a limited function mode in a computer display for use with a computer adapted for operation in an unrestricted use mode and a limited function mode. After initialization 702, the security manager may receive a condition 704. The condition may be checked to determine if the condition is a computer display power up 705, a command for the limited function mode 706, a communication timeout with the computer greater than a specified time duration 714, or a communication error with the computer greater than a specified error threshold 716. If any of these scenarios are true, then the limited function on state may be stored 708 and the output to a portion of the screen may be disabled. Of course, many scenarios are possible.

If the condition is a command to cease operation in the limited function mode 710, the limited function off state may be stored 712, and communication quality may be checked 716. If the quality is acceptable, output may be enabled to the full screen 724, otherwise, output to a portion of the screen may be disabled 722. The stored state 720 may be retained and checked 718 with each condition received 706 to safeguard for overlapping conditions when commands are sent by the computer and the communication channel quality is unstable. After enabling 724 or disabling 722 output, the security manager is ready to respond to another condition 726.

The embodiment in FIG. 8 illustrates a detailed implementation of a display device 800 using LCD technology. The output to an LCD screen 804 may be supported by a set of vertical line driver integrated circuits 806*a-c* and a set of horizontal vertical line driver integrated circuits 808*a-e*. The vertical line driver ICs 806*a-e* may be attached to a ribbon cable 812 that may be in communication with the screen 804. The horizontal line driver ICs 808*a-e* may be placed on the back of the screen 804. The RF generating distorter integrated circuit chips 810*a-b* may be physically proximate to select horizontal line driver ICs 808*b*, 808*d*. When a condition to operate in the limited function mode is detected by the security manager 802, such as a command from a computer over communication link 304, an initial power-up, or a communication loss or degradation, the security manager 802 may direct the RF generating distorters 810*a*, 810*b* to activate distortion. The interference generated by the distorters 810*a*, 810*b* may distort the output from the selected horizontal line drivers 808*b*, 808*d*, thus creating dark horizontal bands on the display the LCD screen 804. When a condition is detected by the security manager 802 to cease operation in the limited function mode, such as a command from the computer and communication with the computer is at a specified level of quality, the security manager 802 may direct the distorters 810*a*, 810*b* to deactivate distortion, thus enabling standard output to the full screen.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A system, comprising:
a computer configured to self-monitor and enforce a compliance with a fee-based operating policy for the computer and Internet service provided via the computer selected from a pay-per-use policy or a subscription policy, wherein the computer is configured to detect anon-compliance with the operating policy and, as a result of the detected non-compliance, operate in a limited function mode, the limited function mode of the computer comprising an impedance of access to at least one peripheral or support circuit; and
a display device in direct physical connection with the computer and including:
a screen;
a display controller in communication with the computer;
a driver in communication with the screen and with the display controller, the driver supporting output to a portion of the screen;
a distorter in communication with the driver and operable to distort at least a portion of the output supported by the driver; and
a security manager in communication with the distorter, the security manager operable to activate the distorter responsive to the detected non-compliance with the operating policy so that a content displayed on a first portion of the screen is disabled and a content displayed on a second portion of the screen remains enabled.

2. The system of claim 1, wherein the security manager comprises:
a port for receiving a command corresponding to one of the detected non-compliance with the operating policy or a detected compliance with the operating policy;
a memory for storing the command; and
a security manager controller operable to direct the distorter to activate responsive to the command corresponding to the detected non-compliance, and to direct the distorter to deactivate responsive to the command corresponding to at least the detected compliance.

3. The system of claim 1, wherein the security manager is further operable to activate the distorter responsive to an additional condition comprising at least one of:
a powering up of the display device;
a communication timeout between the security manager and the computer; or
a communication quality between the security manager and the computer detected above a specified error threshold.

4. The system of claim 2, wherein the security manager further comprises a cryptographic function for verifying the command.

5. The system of claim 1, wherein the display controller and the security manager are the same entity and wherein the security manager is further operable to direct the distorter to activate responsive to a detection of an additional condition, the additional condition comprising at least one of:
a powering up of the display device;
a communication timeout between the display controller and the computer; or a communication quality between the display controller and the computer detected above a specified error threshold.

6. The system of claim 1, wherein the display device further comprises a plurality of distorters, and wherein the security manager is in communication with the plurality of distorters.

7. The system of claim 1, wherein the display device further comprises a plurality of drivers, and wherein the distorter is in communication with more than one of the drivers.

8. The system of claim 1, wherein the distorter comprises:
a port for receiving a signal corresponding to one of activate or deactivate distortion;
a memory for storing astute corresponding to one of activate or deactivate distortion;
a distorter controller operable to activate distortion responsive to the state; and
a cryptographic function for verifying the signal.

9. The system of claim 8, wherein the state corresponding to activate distortion is entered when at least one of the following occurs:
a) a powering up of the distorter;
b) a communication timeout with the security manager detected longer than a specified duration of time; or
c) a communication quality with the security manager detected above a specified error threshold;
and wherein the state corresponding to deactivate distortion is entered when a communication quality with the security manager is detected below a specified error threshold and a signal to deactivate distortion is received.

10. The system of claim 1, further comprising at least one of:
a wireless communication channel between the display controller and the computer;
a wireless communication channel between the driver and the display controller; or
a wireless communication channel between the security manager and the distorter.

11. A display distorter included in a display device, comprising:
a communication channel in communication to a computer in connection with the display device and configured to self-monitor and enforce a compliance with a fee-based operating policy for the computer and Internet service provided via the computer selected from a pay-per-use policy or a subscription policy, wherein the computer is configured to detect anon-compliance with the operating policy and, as a result of the detected non-compliance, operate in a limited function mode, the limited function mode of the computer comprising an impedance of access to the display device, including a distorted display of output to a first portion of a screen of the display device and an undistorted display of output to a second portion of the screen;
a port for receiving a signal corresponding to one of activate or deactivate distortion, wherein the signal corresponding to activate distortion corresponds to the detected non-compliance;
a memory for storing a state corresponding to the signal; and
a distorter controller operable to activate distortion responsive to the state.

12. The display distorter of claim 11, further comprising a cryptographic function for verifying the signal.

13. The display distorter of claim 11, wherein:
the signal corresponding to activate distortion is enabled to correspond to at least one other detected distortion condition selected from:
a) a communication timeout between the display distorter and the computer,
b) a communication quality above a specified error threshold over the communication channel, or
c) a power up of the display distorter; and
the signal corresponding to deactivate distortion corresponds to both a detected compliance with the operating policy and an absence of any other detected distortion condition.

14. A method of enforcing a limited function mode in a computer display, comprising:
configuring the computer display to include a security manager and a distorter;
configuring a computer to self-monitor and enforce a compliance with a fee-based operating policy for the computer and Internet service provided via the computer selected from a pay-per-use policy or a subscription policy, wherein the computer is configured to detect a non-compliance with the operating policy and, as a result of the detected non-compliance, operate in a limited function mode, the limited function mode of the computer comprising an impedance of access to at least one peripheral or support circuit;
coupling the computer display to the computer;
determining at the security manager the detected non-compliance with the operating policy;
disabling, via the distorter, output to a first portion of a screen of the computer display responsive to the detected non-compliance; and
maintaining an enabled display of information on a remaining portion of the screen while disabling the output to the first portion of the screen;
and further comprising determining at the security manager a detected compliance with the operating policy and re-enabling output to the first portion of the screen in response to at least the detected compliance.

15. The method of claim 14, further comprising:
determining at the security manager an additional condition selected from:
a powering up the computer display;
a communication timeout with the computer; or
a communication quality between the computer and the computer display above a specified error threshold;
disabling output to the first portion of the screen responsive to the additional condition;
maintaining an enabled display of information on the remaining portion of the screen while disabling the output to the first portion of the screen responsive to the additional condition;
determining at the security manager an absence of the additional condition; and
re-enabling output to the first portion of the screen responsive to the absence of the additional condition.

16. The method of claim 15, wherein re-enabling output to the first portion of the screen responsive to the absence of the additional condition comprises re-enabling output to the first portion of the screen responsive to both an absence of any additional condition and to the detected compliance with the operating policy.

17. The method of claim 15, further comprising executing, by the security manager, a cryptographic function for verifying a command corresponding to at least one of the detected non-compliance, the detected compliance, or the additional condition.

18. The method of claim 14, further comprising:
- disposing display drivers on the screen corresponding to the first and the remaining portions of the screen, and
- disposing the distorter in a location on the display device so that the distorter is operable to disable output of the display drivers corresponding to the first portion of the screen.

19. The method of claim 18, further comprising disposing a plurality of distorters on the display device and communicatively coupling each display driver to a corresponding distorter.

20. The method of claim 18, further comprising disabling the output to the first portion of the screen when the distorter determines at least one of:
- a powering up of the computer display,
- a communication timeout with the security manager, or
- a communication quality between the distorter and the security manager above a specified error threshold;
- and further comprising enabling the output to the first portion of the screen upon the distorter receiving a signal corresponding to the detected compliance with the operating policy and detecting a communication quality between the distorter and the security manager below a specified error threshold.

* * * * *

UNITED STATES PATENT AND TRADEMARK OFFICE
CERTIFICATE OF CORRECTION

| | | |
|---|---|---|
| PATENT NO. | : 7,750,923 B2 | Page 1 of 1 |
| APPLICATION NO. | : 11/696848 | |
| DATED | : July 6, 2010 | |
| INVENTOR(S) | : Hanumant Kumar Yadav et al. | |

It is certified that error appears in the above-identified patent and that said Letters Patent is hereby corrected as shown below:

In column 10, line 14, in Claim 1, delete "anon-compliance" and insert -- a non-compliance --, therefor.

In column 11, line 14, in Claim 8, delete "astute" and insert -- a state --, therefor.

In column 11, line 50, in Claim 11, delete "anon-compliance" and insert -- a non-compliance --, therefor.

Signed and Sealed this
Tenth Day of May, 2011

David J. Kappos
*Director of the United States Patent and Trademark Office*